(12) United States Patent
Ke et al.

(10) Patent No.: US 12,469,889 B2
(45) Date of Patent: Nov. 11, 2025

(54) MULTIPURPOSE BATTERY PACK

(71) Applicant: ZHEJIANG LERA NEW ENERGY POWER TECHNOLOGY CO., LTD, Ningbo (CN)

(72) Inventors: Hengzhao Ke, Ningbo (CN); Jianhong Dai, Ningbo (CN)

(73) Assignee: ZHEJIANG LERA NEW ENERGY POWER TECHNOLOGY CO., LTD, Ningbo (CN)

( * ) Notice: Subject to any disclaimer, the term of this patent is extended or adjusted under 35 U.S.C. 154(b) by 580 days.

(21) Appl. No.: 18/013,909

(22) PCT Filed: Jul. 21, 2021

(86) PCT No.: PCT/CN2021/107564
§ 371 (c)(1),
(2) Date: Dec. 30, 2022

(87) PCT Pub. No.: WO2022/022356
PCT Pub. Date: Feb. 3, 2022

(65) Prior Publication Data
US 2023/0318051 A1    Oct. 5, 2023

(30) Foreign Application Priority Data

Jul. 27, 2020 (CN) .......................... 202021506770.0
Jan. 11, 2021 (CN) .......................... 202110030154.5

(51) Int. Cl.
*H01M 10/42* (2006.01)
*B25F 5/02* (2006.01)
(Continued)

(52) U.S. Cl.
CPC ..... *H01M 10/4257* (2013.01); *H01M 50/503* (2021.01); *H01M 50/519* (2021.01);
(Continued)

(58) Field of Classification Search
CPC ........... H01M 10/4257; H01M 50/503; H01M 50/519; H01M 2220/30; H01M 50/207;
(Continued)

(56) References Cited

U.S. PATENT DOCUMENTS 4,160,941 A * 7/1979 Bennett ................. H02J 7/0013
307/56
5,227,262 A * 7/1993 Ozer ................... H01M 50/296
348/E5.025
(Continued)

FOREIGN PATENT DOCUMENTS

CN    102632486 A      8/2012
CN    103474595 A *  12/2013 ............ H01M 50/00
(Continued)

*Primary Examiner* — M Baye Diao
(74) *Attorney, Agent, or Firm* — Bayramoglu Law Offices LLC

(57) ABSTRACT

A multipurpose battery pack includes: a housing, and a battery cell and a circuit board that are disposed in the housing; a first electrical connector connecting one of positive and negative electrodes of the battery cell to the circuit board; a second electrical connector connecting the other one of the positive and negative electrodes of the battery cell to the circuit board; a third electrical connector disposed on the circuit board and including at least one interface, where the interface is adapted to be electrically connected to an external electrical device, to supply power from the battery cell to the electrical device through the third electrical connector; a first connection member adapted to be in a latching connection with a first electrical device; and a second connection member adapted to be in a latching connection with a second electrical device.

18 Claims, 5 Drawing Sheets

(51) Int. Cl.
*H01M 50/503* (2021.01)
*H01M 50/519* (2021.01)
*H02J 7/00* (2006.01)

(52) U.S. Cl.
CPC ............... *H02J 7/0063* (2013.01); *B25F 5/02* (2013.01); *H01M 2220/30* (2013.01)

(58) Field of Classification Search
CPC ............. H01M 50/247; H01M 50/284; H01M 50/531; H01M 2010/4271; H01M 50/50; H01M 50/204; H01M 50/296; H02J 7/0063; B25F 5/02; H01R 13/6271; H01R 13/64; Y02E 60/10
USPC ........................................................ 320/127
See application file for complete search history.

(56) References Cited

U.S. PATENT DOCUMENTS

| | | | | |
|---|---|---|---|---|
| 5,613,030 | A | * | 3/1997 | Hoffer ................ G02B 6/44526 385/135 |
| 5,736,271 | A | * | 4/1998 | Cisar ..................... H02J 7/0045 429/96 |
| 8,546,012 | B2 | * | 10/2013 | Reber ................. H01M 50/289 429/163 |
| 8,901,884 | B2 | * | 12/2014 | Maleus ................. H02J 7/0014 320/132 |
| 2004/0257035 | A1 | * | 12/2004 | Chang ..................... F21L 4/005 320/107 |
| 2009/0255084 | A1 | * | 10/2009 | Gee, II ................. A47L 9/2873 429/96 |
| 2012/0078278 | A1 | * | 3/2012 | Bales, Jr. ....... A61B 17/320092 307/116 |

FOREIGN PATENT DOCUMENTS

| | | | | |
|---|---|---|---|---|
| CN | 203632306 U | | 6/2014 | |
| CN | 109808797 A | | 5/2019 | |
| CN | 110649668 A | | 1/2020 | |
| CN | 210349932 U | | 4/2020 | |
| CN | 210724240 U | | 6/2020 | |
| CN | 210724241 U | | 6/2020 | |
| CN | 112820997 A | | 5/2021 | |
| CN | 112865492 A | | 5/2021 | |
| CN | 109454597 B | * | 8/2021 | ................ B25F 5/00 |
| EP | 2924451 B1 | * | 1/2019 | ................ G01R 1/04 |
| JP | 2019139512 A | | 8/2019 | |
| WO | WO-2013122405 A1 | * | 8/2013 | .......... H01M 10/482 |
| WO | WO-2017143597 A1 | * | 8/2017 | .......... H01M 50/522 |
| WO | WO-2017189786 A1 | * | 11/2017 | .......... H01M 50/204 |

* cited by examiner

__MULTIPURPOSE BATTERY PACK__

CROSS REFERENCE TO THE RELATED APPLICATIONS

This application is the national phase entry of International Application No. PCT/CN2021/107564, filed on Jul. 21, 2021, which is based upon and claims priority to Chinese Patent Application No. 202021506770.0, filed on Jul. 27, 2020; and Chinese Patent Application No. 202110030154.5, filed on Jan. 11, 2021, the entire contents of which are incorporated herein by reference.

TECHNICAL FIELD

The present disclosure relates to a multipurpose battery pack.

BACKGROUND

In order to improve the versatility of power tools and make the working range of power tools not limited by the location of the socket, many power tools on the market are powered by battery packs. Power tools are easy to carry and simple to operate and have multiple functions, which can greatly reduce labor intensity, improve work efficiency, and mechanize manual operation, and thus are widely used in construction, housing decoration, automobile, machinery, electric power, bridge, gardening and other fields. Usually, a conventional battery pack can match multiple tools in the same use environment. For example, a battery pack can be used for garden tools, such as a grass trimmer, a brush cutter, a chainsaw, and a pruner. However, when the battery pack matches power tools in the different use environment, the battery pack suffers from many limitations that affect the user feel or cause a mismatch in fit between the battery pack and the tool limited by its own structure and differences in the tool structures.

SUMMARY

The purpose of the present disclosure is to provide a multipurpose battery pack that can match multiple tools regardless of the use environment.

The present disclosure provides a multipurpose battery pack including:
  a housing, and a battery cell and a circuit board that are disposed in the housing;
  a first electrical connector connecting one of the positive and negative electrodes of the battery cell to the circuit board;
  a second electrical connector connecting the other one of the positive and negative electrodes of the battery cell to the circuit board;
  a third electrical connector disposed on the circuit board and including at least one interface, where the interface is adapted to be electrically connected to an external electrical device, to supply power from the battery cell to the electrical device through the third electrical connector;
  a first connection member adapted to be in a latching connection with a first electrical device; and
  a second connection member adapted to be in a latching connection with a second electrical device.

The first connection member and the second connection member are of different shapes and/or sizes and do not interfere with each other when in a latching connection with the corresponding electrical devices.

Further, the multipurpose battery pack includes linear path segments in a latching connection with the electrical devices, where the linear path segments are located in the same straight line or in parallel lines when the first connection member and the second connection member are in a latching connection with the corresponding electrical devices.

Further, the first connection member and the second connection member are latch slots and the electrical devices each are provided with a corresponding latch.

When the latch is in a latching connection with one of the latch slots, the latch does not match the other latch slot on a latch travel path.

Additionally, or alternatively, when the latch is unlatched and disconnected from one of the latch slots, the latch does not match the other latch slot on an unlatch and disconnection path.

Further, the first connection member and the second connection member have a length direction that is perpendicular to a length direction of the multipurpose battery pack and have different lengths.

Further, the latch slots have different slot spacings in a direction perpendicular to the length direction of the multipurpose battery pack.

Compared with the prior art, the present disclosure has the following beneficial technical effects:

In the technical solution, at least two connection members of different shapes and/or sizes are disposed on the battery pack, and the connection members can selectively be matched to different tools for use but do not interfere with each other during use to ensure users' feeling of operation.

Another purpose of the present disclosure is to provide a multipurpose battery pack based on a specific shape, which is adapted to be in a latching connection with electrical devices.

The present disclosure provides a multipurpose battery pack, including:
  a housing, and a battery cell and a circuit board that are disposed in the housing, where
    the housing includes an arc surface, a first side and a second side that are connected to the arc surface and opposite to each other, and a third side located between the first side and the second side and extending along a length direction of the battery pack;
  a first electrical connector connecting one of positive and negative electrodes of the battery cell to the circuit board;
  a second electrical connector connecting the other one of the positive and negative electrodes of the battery cell to the circuit board;
  a third electrical connector disposed on the circuit board and including at least one interface, where the interface is adapted to be electrically connected to an external electrical device, to supply power from the battery cell to the electrical device through the third electrical connector; and
  a first connection member adapted to be in a latching connection with a first electrical device.

The first connection member is disposed on the third side and has a length direction that is perpendicular to the length direction of the third side.

Further, the third side at least partially includes a continuously extending plane.

Further, the multipurpose battery pack includes a second connection member, where the second connection member is adapted to be in a latching connection to a second electrical device. The first connection member and the second connection member do not interfere with each other when in a latching connection with the corresponding electrical devices.

Further, the second connection member is disposed on the third side.

Further, the second connection member has a length direction that is perpendicular to the length direction of the third side and has a length different from a length of the first connection member.

Further, the first connection member and the second connection member are latch slots and the electrical devices each are provided with a corresponding latch.

When the latch is in a latching connection with one of the latch slots, the latch does not match the other latch slot on a latch travel path.

Additionally, or alternatively, when the latch is unlatched and disconnected from one of the latch slots, the latch does not match the other latch slot on an unlatch and disconnection path.

Compared with the prior art, the present disclosure has the following beneficial technical effects:

In the technical solution, the third electrical connector including at least one interface is provided. The interface can be used to supply power to different electrical devices, such as 3C-type electronic devices or high-current power tools. In addition, based on a specific shape of the battery pack, the connection members matching the electrical devices are disposed on specific sides of the battery pack, which is convenient for use and facilitates aesthetic shape design of the battery pack.

Another purpose of the present disclosure is to provide a multipurpose battery pack that can match multiple tools for use.

The present disclosure provides a multipurpose battery pack, including:
- a housing, and a battery cell and a circuit board that are disposed in the housing;
- a first electrical connector connecting one of positive and negative electrodes of the battery cell to the circuit board;
- a second electrical connector connecting the other one of the positive and negative electrodes of the battery cell to the circuit board;
- a discharge interface for power tools disposed on the circuit board and including at least one interface, where the interface is adapted to be electrically connected to an external electrical device, to supply power from the battery cell to the electrical device through the discharge interface for power tools;
- a first connection member adapted to be in a latching connection with a first electrical device and close to the discharge interface for power tools; and
- a second connection member adapted to be in a latching connection with a second electrical device and away from the discharge interface for power tools.

The first connection member does not interfere with the second electrical device when the second connection member is correspondingly in a latching connection with or unlatched and disconnected from the second electrical device.

Further, the first connection member is a first latch slot, the second connection member is a second latch slot, the first electrical device is provided with a corresponding first latch, and the second electrical device is provided with a corresponding second latch.

When the second latch slot is correspondingly in a latching connection with or unlatched and disconnected from the second latch, the first latch slot does not match the second latch.

Further, the first latch slot and the second latch slot are in a bar shape and have a length direction that is perpendicular to the length direction of the multipurpose battery pack, and the length of the second latch slot is greater than the length of the first latch slot.

Compared with the prior art, the present disclosure has the following beneficial technical effects:

In the technical solution, the discharge interface for power tools is provided to supply power to the electrical devices, two connection members are disposed to selectively match different tools for use, and the connection members do not interfere with each other during use.

A further purpose of the present disclosure is to provide a multipurpose battery pack that can match multiple tools for use.

The present disclosure provides a multipurpose battery pack, including:
- a housing, and a battery cell and a circuit board that are disposed in the housing;
- a first electrical connector connecting one of positive and negative electrodes of the battery cell to the circuit board;
- a second electrical connector connecting the other one of the positive and negative electrodes of the battery cell to the circuit board;
- a discharge interface for power tools disposed on the circuit board and including at least one interface, where the interface is adapted to be electrically connected to an external electrical device, to supply power from the battery cell to the electrical device through the discharge interface for power tools;
- a first connection member adapted to be in a latching connection with a first electrical device and close to the discharge interface for power tools; and
- a second connection member adapted to be in a latching connection with a second electrical device and away from the discharge interface for power tools.

When the first connection member is correspondingly in a latching connection with or unlatched and disconnected from the first electrical device along a first linear path segment, the second connection member is located outside the first linear path segment.

Further, the first connection member and the second connection member are in the same plane.

Compared with the prior art, the present disclosure has the following beneficial technical effects:

In the technical solution, the discharge interface for power tools is provided to supply power to the electrical devices, two connection members are disposed to selectively match different tools for use, and the connection members do not interfere with each other during use.

BRIEF DESCRIPTION OF THE DRAWINGS

To describe the technical solutions in the specific implementations of the present disclosure or the prior art more clearly, the accompanying drawings required for describing the specific implementations or the prior art are briefly described below. The accompanying drawings in the following description show merely some implementations of the present disclosure, and a person of ordinary skill in the art may still derive other accompanying drawings from these accompanying drawings without creative efforts.

DETAILED DESCRIPTION OF THE EMBODIMENTS

The following clearly and completely describes the technical solutions of the present disclosure with reference to the accompanying drawings. The described embodiments are merely some, rather than all of the embodiments of the present disclosure. All other embodiments obtained by those of ordinary skill in the art based on the embodiments of the present disclosure without creative efforts shall fall within the protection scope of the present disclosure.

Figure 1:
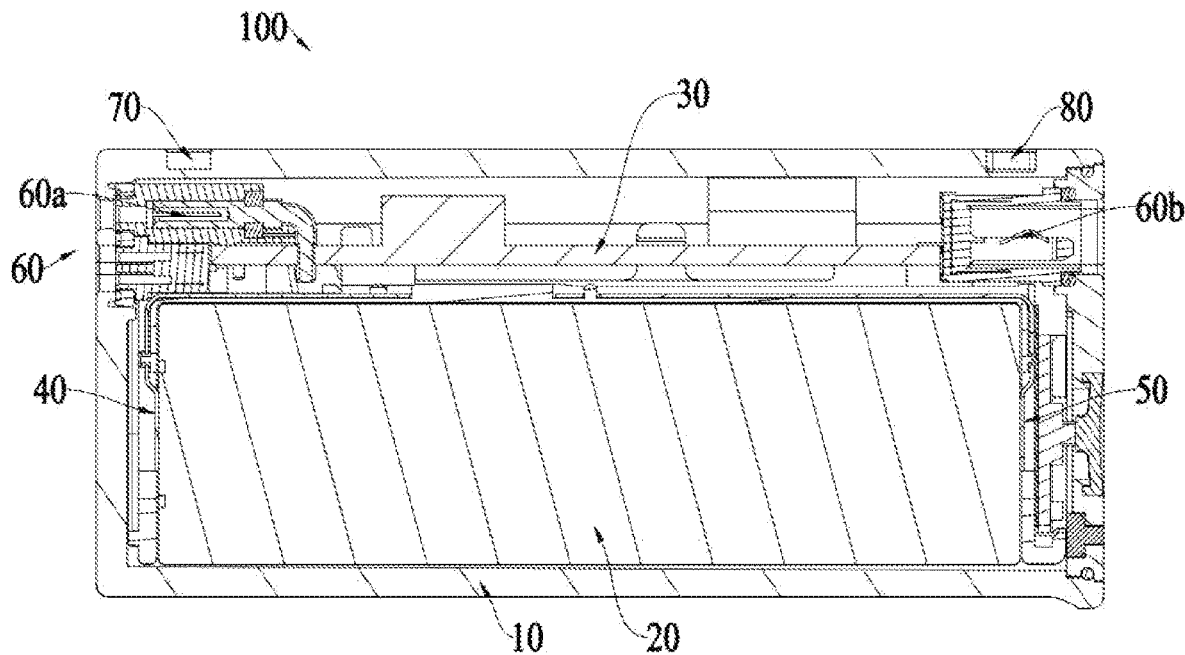
FIG. 1 is a sectional view of a structure of a multipurpose battery pack according to an embodiment of the present disclosure.
Figure 2:
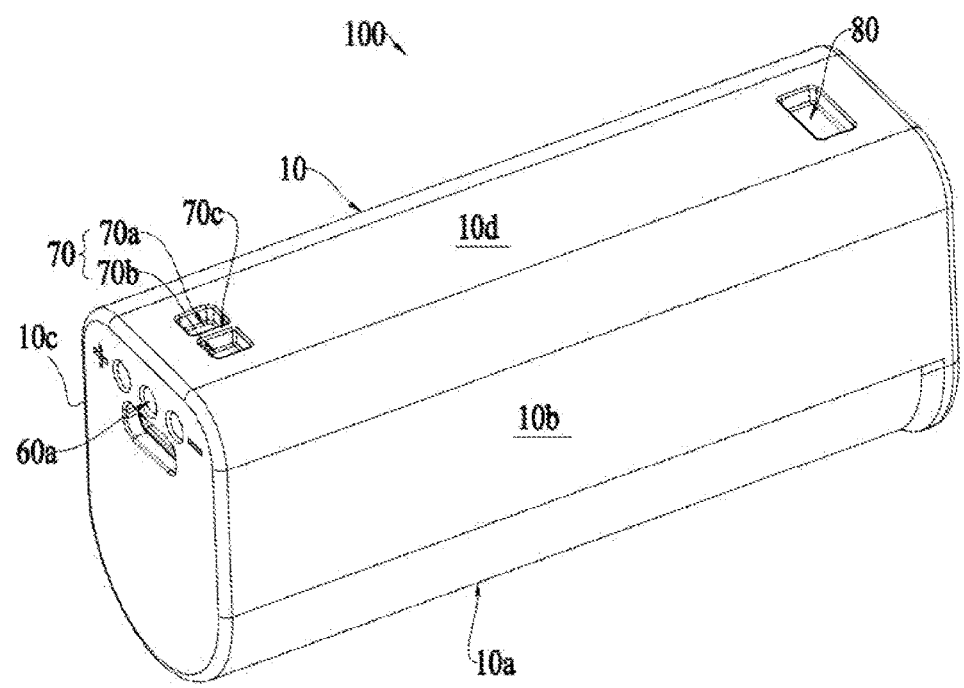
FIG. 2 is a stereoscopic view of a structure of a multipurpose battery pack according to an embodiment of the present disclosure.

As shown in FIG. 1 and FIG. 2, multipurpose battery pack 100 includes:
- housing 10, and battery cell 20 and circuit board 30 that are disposed in the housing 10;
- first electrical connector 40 connecting one of the positive and negative electrodes of the battery cell 20 to the circuit board 30;
- second electrical connector 50 connecting the other one of the positive and negative electrodes of the battery cell 20 to the circuit board 30;
- third electrical connector 60 disposed on the circuit board 30 and including at least one interface, where the interface is adapted to be electrically connected to external electrical devices, to supply power from the battery cell to the electrical devices (200a and 200b) through the third electrical connector;
- first connection member 70 adapted to be in a latching connection with the first electrical device 200a;
- second connection member 80 adapted to be in a latching connection with the second electrical device 200b.

The first connection member 70 and the second connection member 80 do not interfere with each other when in a latching connection with the corresponding electrical devices (200a and 200b).

In particular, the first connection member 70 and the second connection member 80 are of different shapes and/or sizes.

The first electrical connector 40 and the second electrical connector 50 preferably are made from metallic conductive nickel sheets, which are connected to the positive and negative electrodes of the battery cell through spot welding.

In addition, more preferably, the third electrical connector 60 may include interface 60b adapted to supply power to 3C electronic products, such as a USB interface for 3C and 3C peripheral electronic devices, and may further include discharge interface 60a adapted to supply power to power tools. The power tools are not limited to cordless handheld power tools but also include garden tools, cordless vacuum cleaners, DC air compressors, and other power equipment that use secondary batteries as a power source.

In addition, the discharge interface 60a includes not only a plug-in terminal commonly used in battery packs of conventional power tools or garden tools but also includes a pin discharge terminal to facilitate the sealing design of the battery pack.

Figure 3:
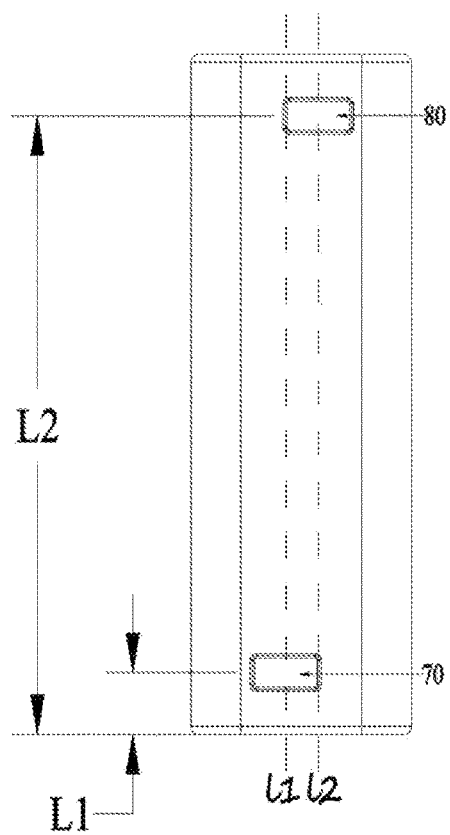
FIG. 3 is a front view of a structure of a multipurpose battery pack according to Embodiment 1 of the present disclosure.

As shown in FIG. 3, the multipurpose battery pack 100 has linear path segments L1 and L2 in a latching connection with the electrical devices (200a and 200b). The linear path segments L1 and L2 are located on the same straight line 1 or on parallel lines l1 and l2 when the first connection member 70 and the second connection member 80 are in a latching connection with the corresponding electrical devices (200a and 200b).

Specifically, the first connection member 70 is adapted to be in a latching connection with the first electrical device 200a, and when the two are in a latching connection, the multipurpose battery pack 100 forms the linear path segment L1. The second connection member 80 is adapted to be in a latching connection with the second electrical device 200b, and when the two are in a latching connection, the multipurpose battery pack 100 forms the linear path segment L2. The linear path segments L1 and L2 are located on the same straight line 1 or on the parallel lines l1 and l2.

As shown in FIG. 3, the linear path segments L1 and L2 are located on the parallel lines l1 and l2, that is, l1 and l2 are located on the same plane. In this case, the first connection member 70 and the second connection member 80 are staggered from each other.

Figure 5:
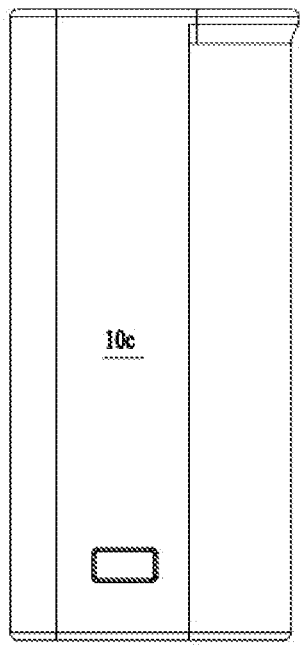
FIG. 5 is a side view of a structure of a multipurpose battery pack according to Embodiment 3 of the present disclosure.
Figure 6:
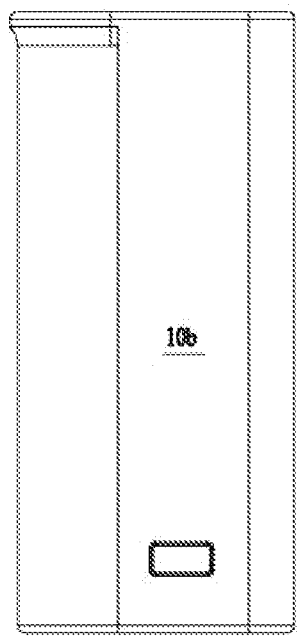
FIG. 6 is another side view of the structure of the multipurpose battery pack according to Embodiment 3 of the present disclosure.

Certainly, l1 and l2 may alternatively be located on different planes. As shown in FIG. 5 and FIG. 6, the first connection member 70 and the second connection member 80 are located on two opposite surfaces of the battery pack.

Figure 4:
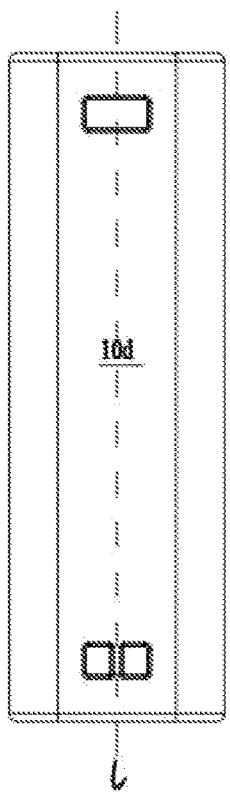
FIG. 4 is a front view of a structure of a multipurpose battery pack according to Embodiment 2 of the present disclosure.

As shown in FIG. 4, the first connection member 70 and the second connection member 80 are disposed on the same surface of the battery pack 100 along a length direction of the battery pack, and the central axes of the two are co-linear, as shown by line 1. Alternatively, the central axes may be parallel to each other.

Figure 7:
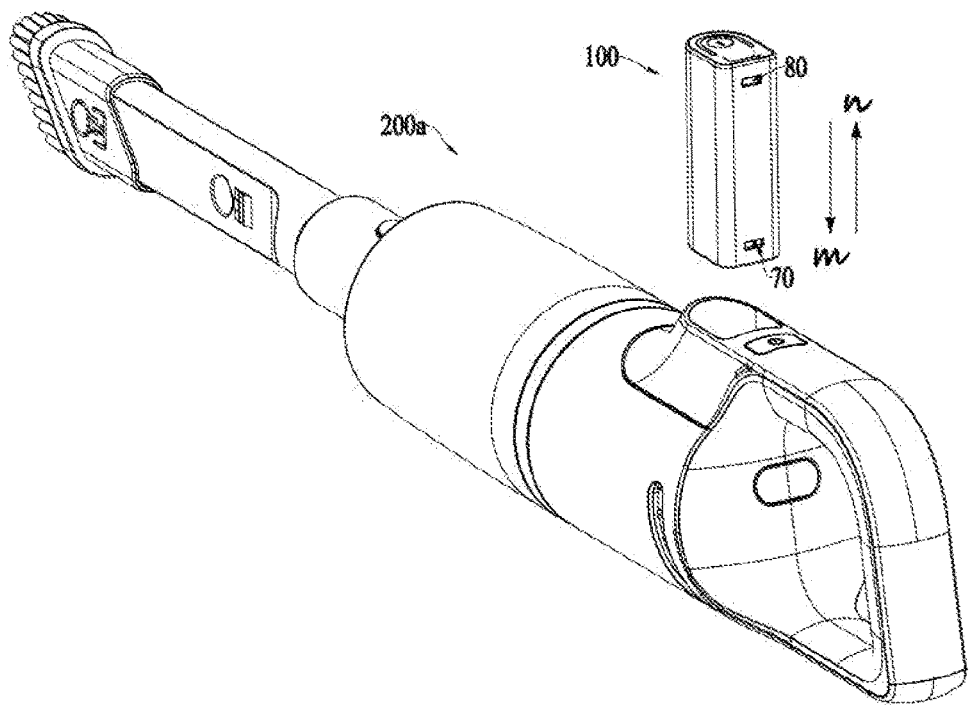
FIG. 7 is a diagram of a multipurpose battery pack assembled with a cleaning device according to an embodiment of the present disclosure.
Figure 8:
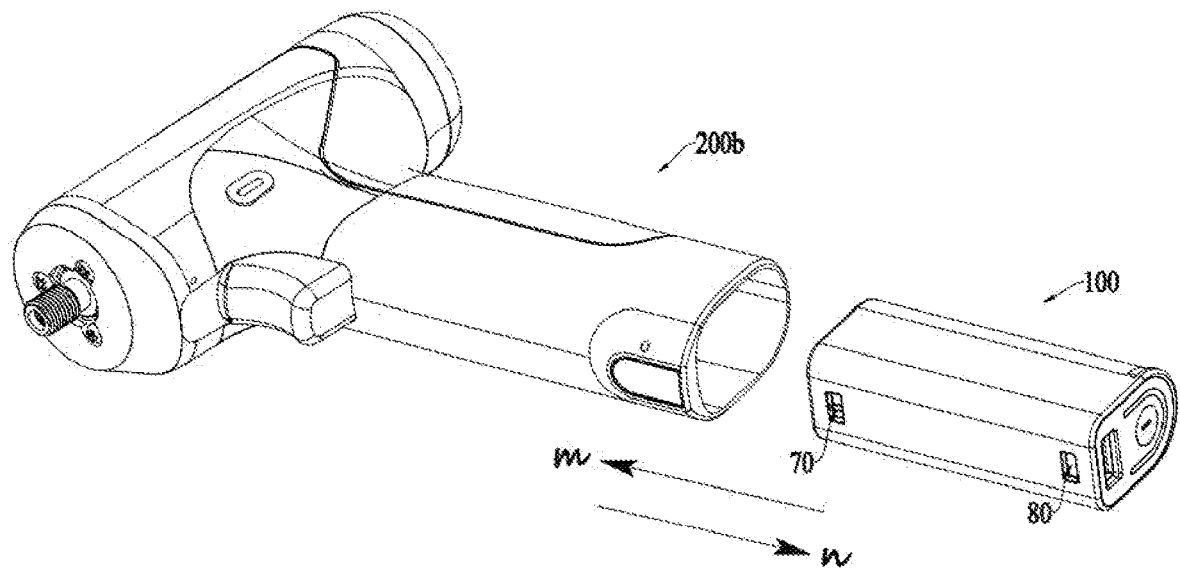
FIG. 8 is a diagram of a multipurpose battery pack assembled with a power tool according to an embodiment of the present disclosure.

As shown in FIG. 7 and FIG. 8, the first connection member 70 and the second connection member 80 are latch slots, and the electrical devices (200a and 200b) each are provided with a corresponding latch (not shown in the figures).

When the latch is in a latching connection with one of the latch slots, the latch does not match the other latch slot on latch travel path m.

Additionally, or alternatively, when the latch is unlatched and disconnected from one of the latch slots, the latch does not match the other latch slot on unlatch and disconnection path n.

The first connection member 70 and the second connection member 80 are latch slots disposed at opposite ends of the battery pack 100 and have substantially the same cross-sectional shapes and sizes. One of the latch slots is provided with protruding split rib 70c that splits the latch slot corresponding to the first connection member 70 into two latch slots 70a and 70b.

Alternatively, other structures may be used to form a latching connection between the first connection member 70 and the second connection member 80 with the corresponding electrical devices (200a and 200b), which do not interfere with each other.

Figure 9:
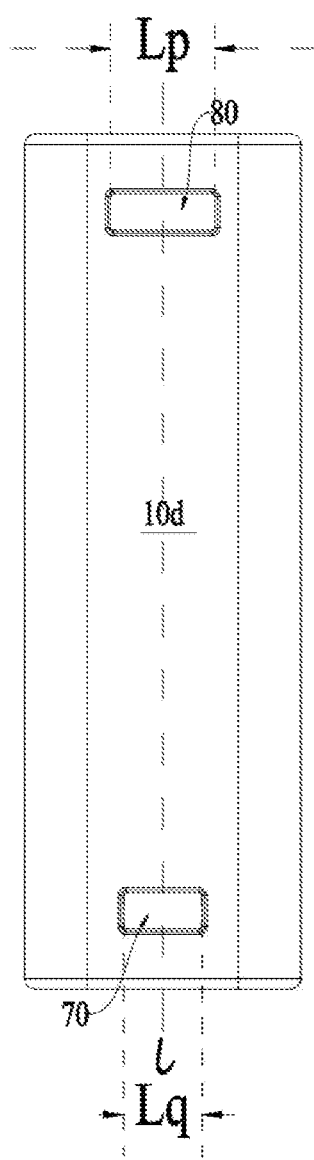
FIG. 9 is a front view of a structure of a multipurpose battery pack according to Embodiment 4 of the present disclosure.

As shown in FIG. 9, the first connection member 70 and the second connection member 80 have a length direction perpendicular to the length direction of the multipurpose battery pack 100 and have different lengths.

Specifically, the first connection member 70 and the second connection member 80 are latch slots, and the latch slots have different slot spacings in a direction perpendicular to the length direction of the multipurpose battery pack. For example, the slot spacing of the first connection member 70 is Lq and the slot spacing of the second connection member 80 is Lp, where Lp>Lq.

In the technical solution, at least two connection members are disposed on the battery pack selectively matched to different tools for use, and the connection members do not interfere with each other during use to ensure users' feeling of operation.

Specifically, as shown in FIG. 7, when the battery pack 100 is matched with the cleaning device 200a, the battery pack 100 is inserted into the cleaning device 200a along the latch travel path m, and the first connection member 70 at the lower end is in a latching connection with the cleaning device 200a. In this case, the second connection member 80 is not on the linear path segment of the latch and does not interfere with the first connection member 70, which does not affect the matching between the battery pack 100 and the cleaning device 200a. Similarly, when the battery pack 100 is disconnected from the cleaning device 200a along the unlatch and disconnection path n, the second connection member 80 is not on the linear path segment of the latch and does not interfere with the first connection member 70, which does not affect the matching between the battery pack 100 and the cleaning device 200a.

As shown in FIG. 8, when the battery pack 100 is matched with the power tool 200b for use, the battery pack 100 is inserted into the power tool 200b along the latch travel path m, and the second connection member 80 at the end is in a latching connection with the power tool 200b. In this case, the first connection member 70 is on the linear path segment of the latch, and therefore, the protruding split rib 70c is disposed in the latch slot corresponding to the first connection member 70 to split the latch slot corresponding to the first connection member 70 into two latch slots 70a and 70b, such that the latch on the power tool 200b does not match the first connection member 70 and only matches the second connection member 80. In this way, the first connection member 70 does not interfere with the second connection member 80 and does not affect the matching between the battery pack 100 and the power tool 200b. Alternatively, as shown in FIG. 9, the first connection member 70 and the second connection member 80 have a length direction that is perpendicular to the length direction of the multipurpose battery pack 100 and have different lengths. Specifically, the first connection member 70 and the second connection member 80 are latch slots, and the latch slots have different slot spacing in the direction perpendicular to the length direction of the multipurpose battery pack. For example, the slot spacing of the first connection member 70 is Lq and the slot spacing of the second connection member 80 is Lp, where Lp>Lq, such that the latch on the power tool 200b does not match the first connection member 70 and only matches the second connection member 80. In this way, the first connection member 70 does not interfere with the second connection member 80 and does not affect the matching between the battery pack 100 and the power tool 200b.

Similarly, when the battery pack 100 is disconnected from the power tool 200b along the unlatch and disconnection path n, the first connection member 70 does not match the latch on the power tool 200b, does not interfere with the second connection member 80, and does not affect the matching between the battery pack 100 and the power tool 200b.

In addition, as shown in FIG. 1 and FIG. 2, a multipurpose battery pack includes:
- housing 10, and battery cell 20 and circuit board 30 that are disposed in the housing 10, where
  the housing 10 includes arc surface 10a, first side 10b and second side 10c that are connected to the arc surface 10a and opposite to each other, and third side 10d located between the first side 10b and the second side 10c and extending along a length direction of the battery pack;
- first electrical connector 40 connecting one of the positive and negative electrodes of the battery cell 20 to the circuit board 30;
- second electrical connector 50 connecting the other one of the positive and negative electrodes of the battery cell 20 to the circuit board 30;
- third electrical connector 60 disposed on the circuit board 30 and including at least one interface, where the interface is adapted to be electrically connected to an external electrical device, to supply power from the battery cell to the electrical device through the third electrical connector 60; and
- first connection member 70 adapted to be in a latching connection with first electrical device 200a, where The first connection member 70 is disposed on the third side 10d and has a length direction that is perpendicular to a length direction of the third side 10d.

Further, the third side 10d at least partially includes a continuously extending plane to facilitate matching with a matching surface of the electrical device.

Further, the multipurpose battery pack includes second connection member 80, where the second connection member 80 is adapted to be in a latching connection with second electrical device 200b. The first connection member 70 and the second connection member 80 do not interfere with each other when in a latching connection with the corresponding electrical devices 200.

Further, the second connection member 80 is disposed on the third side 10d.

Further, the second connection member 80 has a length direction perpendicular to the length direction of the third side 10d and has a length that is different from the length of the first connection member 70.

Further, the first connection member 70 and the second connection member 80 are latch slots, and the electrical devices each are provided with a corresponding latch.

When the latch is in a latching connection with one of the latch slots, the latch does not match the other latch slot on a latch travel path.

Additionally, or alternatively, when the latch is unlatched and disconnected from one of the latch slots, the latch does not match the other latch slot on an unlatch and disconnection path.

In the technical solution, the third electrical connector 60 including at least one interface is provided. The interface can be used to supply power to different electrical devices, such as 3C-type electronic devices or high-current power tools. In addition, based on a specific shape of the battery pack, the connection members matching the electrical devices are disposed on the specific sides of the battery pack, which is convenient for use and facilitates the aesthetic shape design of the battery pack.

Still referring to FIG. 1 to FIG. 9, multipurpose battery pack 100 includes:

housing 10, and battery cell 20 and circuit board 30 that are disposed in the housing 10, where first electrical connector 40 connecting one of the positive and negative electrodes of the battery cell 20 to the circuit board 30;

second electrical connector 50 connecting the other one of the positive and negative electrodes of the battery cell 20 to the circuit board 30;

discharge interface 60a for power tools disposed on the circuit board 30 and including at least one interface, where the interface is adapted to be electrically connected to an external electrical device, to supply power from the battery cell to the electrical device through the discharge interface 60a for power tools;

first connection member 70 adapted to be in a latching connection with a first electrical device and close to the discharge interface 60a for power tools; and second connection member 80 adapted to be in a latching connection with a second electrical device and away from the discharge interface 60a for power tools, where the first connection member 70 does not interfere with the second electrical device when the second connection member 80 is correspondingly in a latching connection with or unlatched and disconnected from the second electrical device.

Specifically, the first connection member 70 is a first latch slot, the second connection member 80 is a second latch slot, the first electrical device is provided with a corresponding first latch, and the second electrical device is provided with a corresponding second latch.

When the second latch slot is correspondingly in a latching connection with or unlatched and disconnected from the second latch, the first latch slot does not match the second latch.

More specifically, referring to FIG. 9, the first latch slot and the second latch slot are in a bar shape and have a length direction that is perpendicular to the length direction of the multipurpose battery pack, and the length of the second latch slot is greater than the length of the first latch slot.

In this way, when the second latch slot is correspondingly in a latching connection with or unlatched and disconnected from the second electrical device because the second latch slot is longer than the first latch slot, the latch of the second electrical device corresponding to the second latch slot is necessarily longer than the first latch slot. In this way, although the first latch slot is on the linear path segment L2 of the second latch slot corresponding to the second electrical device, the latch of the second electrical device does not match the first latch slot because the former is longer, such that no interference occurs.

Still referring to FIG. 1 to FIG. 9, a multipurpose battery pack includes:

housing 10, and battery cell 20 and circuit board 30 that are disposed in the housing 10, where first electrical connector 40 connecting one of the positive and negative electrodes of the battery cell 20 to the circuit board 30;

second electrical connector 50 connecting the other one of the positive and negative electrodes of the battery cell 20 to the circuit board 30;

discharge interface 60a for power tools disposed on the circuit board 30 and including at least one interface, where the interface is adapted to be electrically connected to an external electrical device, to supply power from the battery cell to the electrical device through the discharge interface 60a for power tools;

first connection member 70 adapted to be in a latching connection with a first electrical device and close to the discharge interface 60a for power tools; and second connection member 80 adapted to be in a latching connection with a second electrical device and away from the discharge interface 60a for power tools, where when the first connection member 70 is correspondingly in a latching connection with or unlatched and disconnected from the first electrical device along the first linear path segment L1, the second connection member 80 is located outside the first linear path segment L1.

In this way, the second connection member 80 does not interfere with the first connection member 70, which does not affect the matching between the battery pack 100 and the cleaning device 200a.

The first connection member 70 and the second connection member 80 are preferably located in same plane 10d.

It is also worth mentioning that:

The circuit board 30 is supported on a support framework with spacing, and the minimum spacing between the circuit board and the support framework is not greater than 2 mm. The spacing H effectively ensures heat dissipation effect and installation space between the circuit board 30 and the battery cell 20.

In addition, the width of the circuit board 30 is Y, the diameter of the battery cell 20 is D, and the width Y is 95% of the diameter D or less. In this embodiment, the width Y of the circuit board 30 is 20 mm, and the diameter D of the battery cell 20 is 21 mm.

In addition, the length of the battery cell 20 is L3, the length of the battery pack 100 is L4, and L4 is 1.3 times of L3 or less. The diameter of the battery cell is D, the height of the battery pack is M, and M is 1.8 times of D or less. In a specific embodiment, the length of the battery cell 20 is 70 mm, the length of the battery pack 100 is 82 mm, the diameter of the battery cell 20 is 21 mm, and the height of the battery pack 100 is 36 mm. The above structural can effectively ensure that the battery pack of this embodiment has a compact structure and is easy to carry when used as a mobile power source and can also be applied to various small power tools.

Finally, it should be noted that the above examples are merely intended to describe the technical solutions of the present disclosure, rather than to limit the present disclosure. Although the present disclosure is described in detail with reference to the above embodiments, persons of ordinary skill in the art should understand that they may still make modifications to the technical solutions described in the above embodiments or make equivalent replacements to some or all technical features thereof. However, these modifications or replacements do not depart from the scope of the technical solutions of the embodiments of the present disclosure.

What is claimed is:

1. A multipurpose battery pack, comprising:
a housing, and a battery cell and a circuit board, wherein the battery cell and the circuit board are disposed in the housing;
a first electrical connector, wherein the first electrical connector connects a first one of positive and negative electrodes of the battery cell to the circuit board;
a second electrical connector, wherein the second electrical connector connects a second one of the positive and negative electrodes of the battery cell to the circuit board;
a third electrical connector, wherein the third electrical connector is disposed on the circuit board and the third electrical connector comprises at least one interface, wherein the at least one interface is adapted to be electrically connected to an external electrical device, to supply power from the battery cell to the external electrical device through the third electrical connector;
a first connection member, wherein the first connection member is adapted to be in a latching connection with a first electrical device; and
a second connection member, wherein the second connection member is adapted to be in the latching connection with a second electrical device;
wherein the first connection member and the second connection member are of different shapes and/or sizes and the first connection member and the second connection member do not interfere with each other when the first connection member and the second connection member are in the latching connection with the first and second electrical devices, respectively.

2. The multipurpose battery pack according to claim 1, comprising linear path segments in the latching connection with the first and second electrical devices, wherein the linear path segments are located in a same straight line or in parallel lines when the first connection member and the second connection member are in the latching connection with the first and second electrical devices, respectively.

3. The multipurpose battery pack according to claim 1, wherein the first connection member and the second connection member are latch slots, and the first and second electrical devices each are provided with a latch;
when the latch is in the latching connection with a first one of the latch slots, the latch does not match a second one of the latch slots on a latch travel path; and/or
when the latch is unlatched and disconnected from the first one of the latch slots, the latch does not match the second one of the latch slots on an unlatch and disconnection path.

4. The multipurpose battery pack according to claim 1, wherein the first connection member and the second connection member have a length direction perpendicular to a length direction of the multipurpose battery pack, and the first connection member and the second connection member have different lengths.

5. The multipurpose battery pack according to claim 3, wherein the latch slots have different slot spacings in a direction, wherein the direction is perpendicular to a length direction of the multipurpose battery pack.

6. A multipurpose battery pack, comprising:
a housing, and a battery cell and a circuit board, wherein the battery cell and the circuit board are disposed in the housing, wherein
the housing comprises an arc surface, a first side, a second side, and a third side, wherein the first side and the second side are connected to the arc surface, the first side and the second side are opposite to each other, the third side is located between the first side and the second side, and the third side extends along a length direction of the multipurpose battery pack;
a first electrical connector, wherein the first electrical connector connects a first one of positive and negative electrodes of the battery cell to the circuit board;
a second electrical connector, wherein the second electrical connector connects a second one of the positive and negative electrodes of the battery cell to the circuit board;
a third electrical connector, wherein the third electrical connector is disposed on the circuit board and the third electrical connector comprises at least one interface, wherein the at least one interface is adapted to be electrically connected to an external electrical device, to supply power from the battery cell to the external electrical device through the third electrical connector; and
a first connection member, wherein the first connection member is adapted to be in a latching connection with a first electrical device,
the first connection member is disposed on the third side, and the first connection member has a length direction perpendicular to a length direction of the third side.

7. The multipurpose battery pack according to claim 6, wherein the third side at least partially comprises a continuously extending plane.

8. The multipurpose battery pack according to claim 6, further comprising a second connection member, wherein the second connection member is adapted to be in the latching connection with a second electrical device, and the first connection member and the second connection member do not interfere with each other when the first connection member and the second connection member are in the latching connection with the first and second electrical devices, respectively.

9. The multipurpose battery pack according to claim 8, wherein the second connection member is disposed on the third side.

10. The multipurpose battery pack according to claim 9, wherein the second connection member has a length direction perpendicular to the length direction of the third side and the second connection member has a length different from a length of the first connection member.

11. The multipurpose battery pack according to claim 8, wherein the first connection member and the second connection member are latch slots, and the first and second electrical devices each are provided with a latch;
when the latch is in the latching connection with a first one of the latch slots, the latch does not match a second one of the latch slots on a latch travel path; and/or
when the latch is unlatched and disconnected from the first one of the latch slots, the latch does not match the second one of the latch slots on an unlatch and disconnection path.

12. A multipurpose battery pack, comprising:
a housing, and a battery cell and a circuit board, wherein the battery cell and the circuit board are disposed in the housing;
a first electrical connector, wherein the first electrical connector connects a first one of positive and negative electrodes of the battery cell to the circuit board;
a second electrical connector, wherein the second electrical connector connects a second one of the positive and negative electrodes of the battery cell to the circuit board;

a discharge interface, wherein the discharge interface is for power tools, the discharge interface is disposed on the circuit board, and the discharge interface comprises at least one interface, wherein the least one interface is adapted to be electrically connected to an external electrical device, to supply power from the battery cell to the external electrical device through the discharge interface for the power tools;

a first connection member, wherein the first connection member is adapted to be in a latching connection with a first electrical device and the first connection member is close to the discharge interface for the power tools; and a second connection member, wherein the second connection member is adapted to be in the latching connection with a second electrical device and the second connection member is away from the discharge interface for the power tools;

wherein the first connection member does not interfere with the second electrical device when the second connection member is correspondingly in the latching connection with the second electrical device or the second connection member is unlatched and disconnected from the second electrical device.

13. The multipurpose battery pack according to claim 12, wherein the first connection member is a first latch slot, the second connection member is a second latch slot, the first electrical device is provided with a first latch, and the second electrical device is provided with a second latch; and when the second latch slot is correspondingly in the latching connection with the second latch or the second latch slot is unlatched and disconnected from the second latch, the first latch slot does not match the second latch.

14. The multipurpose battery pack according to claim 13, wherein the first latch slot and the second latch slot are in a bar shape, the first latch slot and the second latch slot have a length direction perpendicular to a length direction of the multipurpose battery pack, and a length of the second latch slot is greater than a length of the first latch slot.

15. A multipurpose battery pack, comprising:
a housing, and a battery cell and a circuit board, wherein the battery cell and the circuit board are disposed in the housing;
a first electrical connector, wherein the first electrical connector connects a first one of positive and negative electrodes of the battery cell to the circuit board;
a second electrical connector, wherein the second electrical connector connects-a second one of the positive and negative electrodes of the battery cell to the circuit board;
a discharge interface, wherein the discharge interface is for power tools, the discharge interface is disposed on the circuit board, and the discharge interface comprises at least one interface, wherein the least one interface is adapted to be electrically connected to an external electrical device, to supply power from the battery cell to the external electrical device through the discharge interface for the power tools;

a first connection member, wherein the first connection member is adapted to be in a latching connection with a first electrical device and the first connection member is close to the discharge interface for the power tools; and a second connection member, wherein the second connection member is adapted to be in the latching connection with a second electrical device and the second connection member is away from the discharge interface for the power tools;

wherein when the first connection member is correspondingly in the latching connection with the first electrical device or the first connection member is unlatched and disconnected from the first electrical device along a linear path segment, the second connection member is located outside the linear path segment.

16. The multipurpose battery pack according to claim 15, wherein the first connection member and the second connection member are located in a same plane.

17. The multipurpose battery pack according to claim 2, wherein the first connection member and the second connection member are latch slots, and the first and second electrical devices each are provided with a latch;

when the latch is in the latching connection with a first one of the latch slots, the latch does not match a second one of the latch slots on a latch travel path; and/or when the latch is unlatched and disconnected from the first one of the latch slots, the latch does not match the second one of the latch slots on an unlatch and disconnection path.

18. The multipurpose battery pack according to claim 7, further comprising a second connection member, wherein the second connection member is adapted to be in the latching connection with a second electrical device, and the first connection member and the second connection member do not interfere with each other when the first connection member and the second connection member are in the latching connection with the first and second electrical devices, respectively.

* * * * *